Feb. 23, 1937.  A. H. OELKERS ET AL  2,071,946
WHEEL AND AXLE ASSEMBLY
Filed Oct. 18, 1933   2 Sheets-Sheet 1
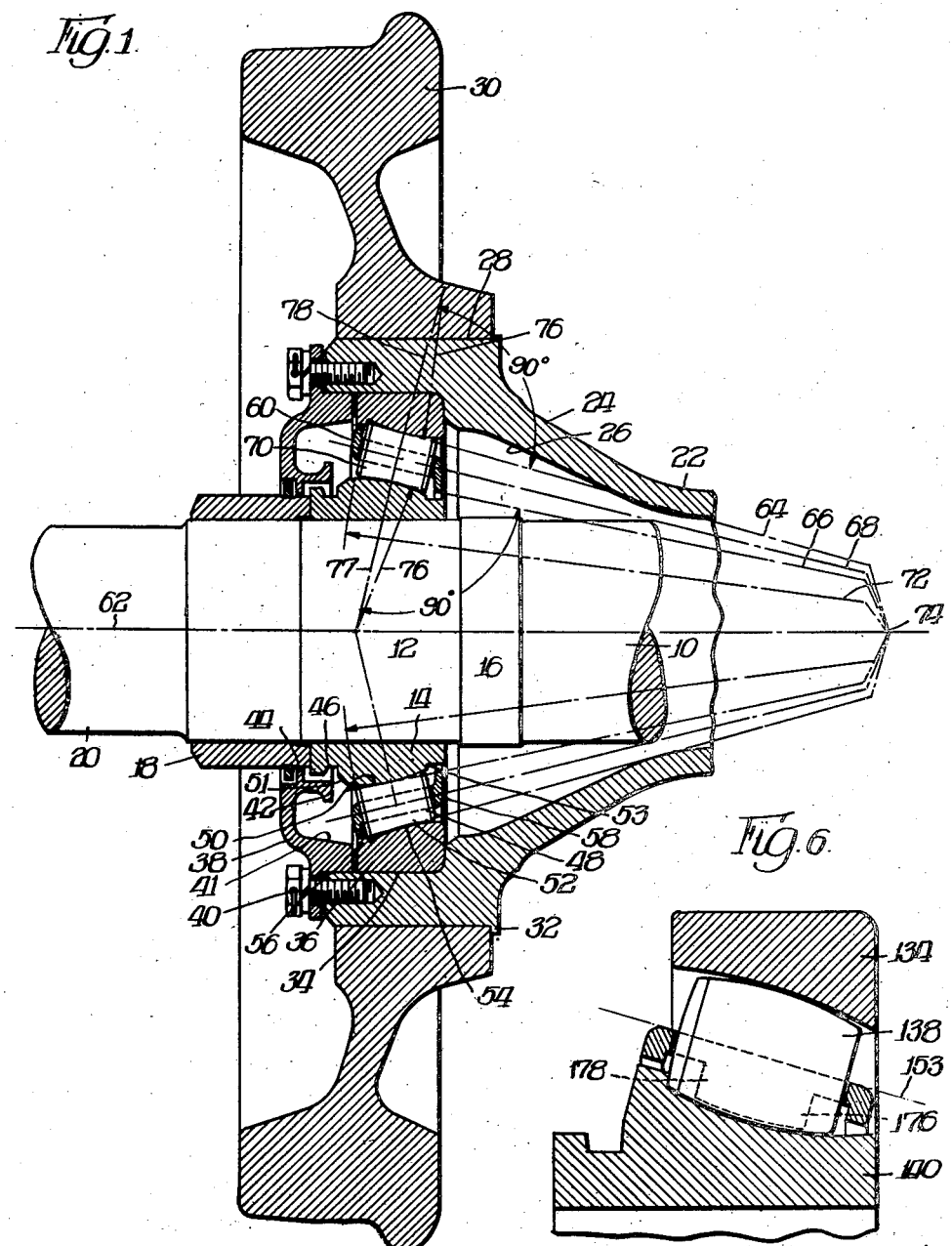
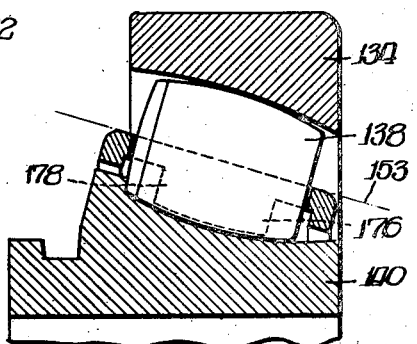
Inventors:
Alfred H. Oelkers,
Fred E. Bachman, Feb. 23, 1937.  A. H. OELKERS ET AL  2,071,946
WHEEL AND AXLE ASSEMBLY
Filed Oct. 18, 1933  2 Sheets-Sheet 2
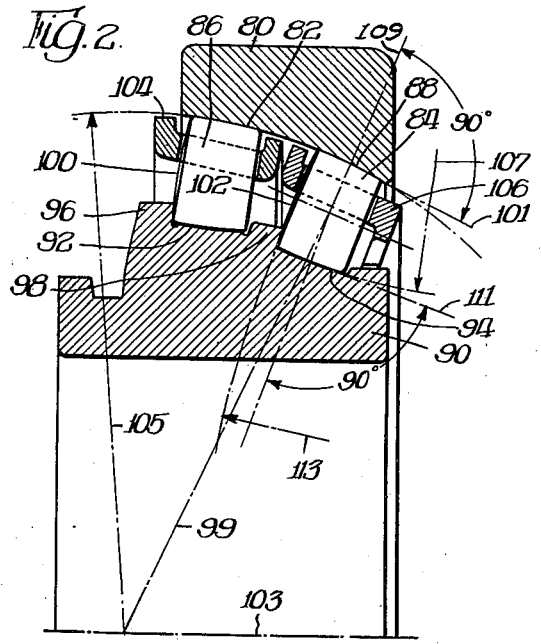
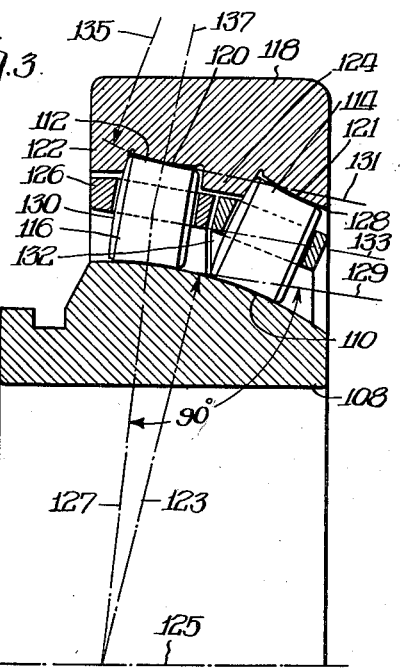
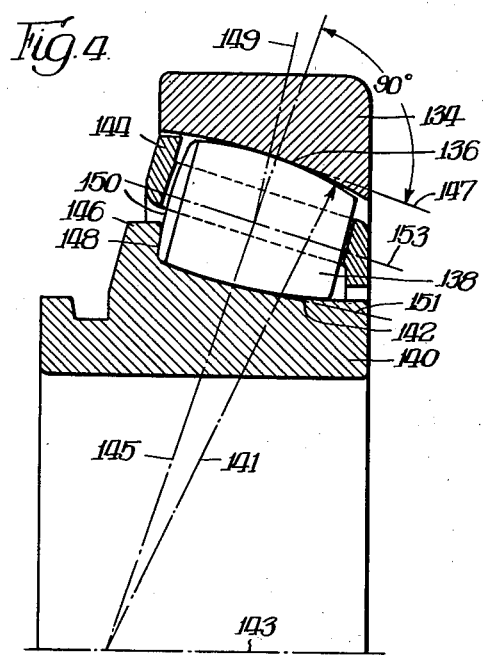
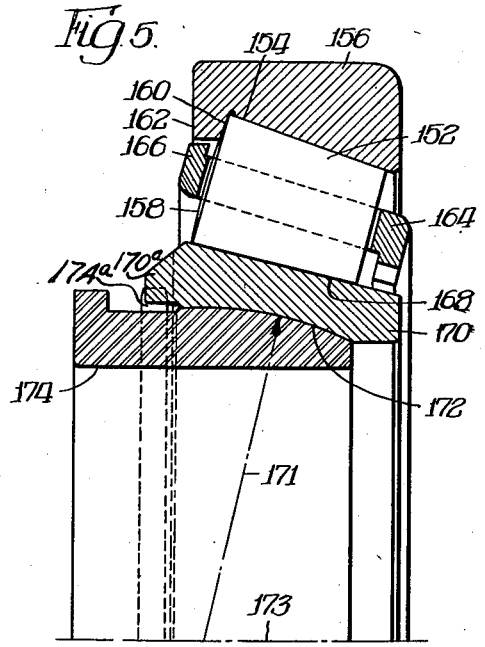
Inventors:
Alfred H Oelkers,
Fred E. Bachman, Patented Feb. 23, 1937

2,071,946

UNITED STATES PATENT OFFICE 2,071,946

WHEEL AND AXLE ASSEMBLY

Alfred H. Oelkers and Fred E. Bachman, Chicago, Ill., assignors to American Steel Foundries, Chicago, Ill., a corporation of New Jersey Application October 18, 1933, Serial No. 694,020

10 Claims. (Cl. 295—36)

This invention pertains to anti-friction bearings, and more particularly to the application of anti-friction bearings to railway wheel and axle assemblies.

In roller bearings of the type to be herein described it is found that in operation the rollers have a tendency to move outwardly of the assembly. In order to counteract this movement and in order to take end thrust on the roller bearing assemblies, a thrust shoulder is provided on one or the other of the racerings to accommodate thrust between the racerings and the rollers. Also, in order to provide for the proper contact between the rollers and the races, they must be proportioned so that the cooperating surfaces between the thrust shoulder and the rollers are properly curved.

An object of this invention is to relieve the rollers of the weight of the retainer and therefore avoid the undesired friction of the load carrying parts.

Another object of the invention is to provide a wheel and axle assembly having anti-friction bearings wherein structure is provided to properly space the rollers, yet permitting free rolling operation of the anti-friction members.

Yet another object of the invention is to provide anti-friction bearings wherein a spacing member, while moved by a portion of the assembly, still permits free operation of the anti-friction members.

Still another object of the invention is to provide an anti-friction bearing assembly wherein relative movements of portions of the assembly are permitted, but free operation of the anti-friction members is insured.

A further object is to provide a roller bearing assembly wherein cooperating thrust surfaces are provided on the rollers and races, making a true thrust contact between the races and the rollers.

A different object of the invention is to provide a wheel and axle assembly wherein portions of the anti-friction bearings are formed of anti-friction metal which will prevent relatively movable parts from freezing, and will prevent excessive wear therebetween.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation through a wheel and axle assembly showing the application thereto of one form of anti-friction bearings embodying the invention; and Figures 2 to 6 inclusive, are enlarged fragmentary sectional elevations through modified forms of anti-friction bearings embodying the invention.

This application is a continuation-in-part of application Serial No. 528,548, filed April 8, 1931.

Referring first of all more particularly to Figure 1, the inner normally non-rotatable axle 10 is provided with a bearing receiving portion 12 on which the cone 14 of an anti-friction bearing assembly is mounted, the axle being provided with a shoulder 16 against which, or adjacent which, the cone is disposed, depending on the particular application of the bearings. The cone is maintained in operative position by means of a shrink collar 18, and the inner axle is provided with an outwardly extending bearing portion 20 adapted to have cooperative relation with the usual brasses and wedges in the standard A. R. A. journal box. It is of course to be understood that the axle 10 may be associated with any form of journal box, or in direct cooperation with a portion of the side frame of a truck, and may be wholly fixed, floating or semi-floating, and may or may not have vertical or lateral, or other movement with respect to the adjacent truck frame.

The outer casing or revoluble axle 22 is provided with a flared portion 24 forming a lubricant recess 26, the axle terminating in a wheel hub portion 28 on which a wheel 30 is mounted, the wheel being limited in its inward position on the hub portion by means of the shoulder 32. The lubricant recess terminates in a bearing recess 34 in which the cup 36 is mounted, the recess being closed by means of the cover plate 38 secured in position on the casing by means of the bolts 40, the cover plate being provided with an inwardly extending portion 41 which may serve to position the cup. The cover plate is provided with a lubricant conducting channel 42 and baffle means 44 formed partially with means removably disposed on the shrink ring. The cone 14 forms a part of the baffle means, and is also provided with a lubricant conducting channel 46 which may or may not accommodate a baffle overlying the channel 42.

The anti-friction bearings 48 are of the self-aligning dual duty type, for carrying both axial and radial loads, the bearing portion 50 of the cone being made up of spherical elements cooperating with properly formed elements or rollers 52. The cone is provided with interrupted portions 51 and 53 for preventing stress concentrations at the ends of the rollers when there is relative movement transversely of the bearing assembly as when the inner axle is deflected. The cup is formed with a cooperating curved element 54 contacting the rollers throughout their bearing length, and the cup is provided with a thrust shoulder 56 disposed at the outer end of the assembly. The roller cage 58 is provided with the outwardly extending flange 60 having guiding cooperating engagement with the thrust shoulder 56 whereby it is guided to run concentrically of the assembly. The roller is placed at an angle with the center line 62 of the axle around which it revolves and is proportioned so that the lines 64 and 66 drawn tangent to the roller surface at or adjacent the middle portion converge at one point in the center line 62 of the bearing or inner axle, and also on the center line 68 of the individual rollers. The large or outer end 70 of the roller is of spherical shape. The center of the radius 72 of the sphere is that center 74 defined by the intersection of the lines 62, 64, 66, and 68. The guiding flange on the outer end of the cup against which the rollers operate is of similar spherical shape so that a surface contact is made between the guiding flange and the end of the roller. For practical purposes, a straight line tangent to the arc defined by the radius 72 forming the end of the roller may be used to form the contacting surface of the thrust shoulder 56. The bearing elements of the cup and cone are formed on radii 76 disposed respectively on lines 77 and 78 normal to the tangents 66 and 64, the length of the radii being determined by the intersection of the normal 77 with the center line 62.

Referring now to the construction shown in Figure 2, an anti-friction bearing assembly is shown provided with two courses of roller and cage assemblies. In this bearing the outer race 80 has a spherical bearing cooperating surface 82 on which the rollers 84 of the courses 86 and 88 contact. Each roller is provided with bearing surfaces formed of spherical or convexed elements contacting substantially throughout their bearing length with the bearing surface 82. The cone 90 is provided with spaced concaved bearing surfaces 92 and 94 opposing the cup and having guiding flanges 96 and 98 contacting the outer ends 100 and 102 of the rollers. Separate cages 104 and 106 are provided formed to be rotated with the cup. The outer ends of the rollers as well as the cooperating surfaces of the guiding flanges 96 and 98 are portions of spherical surfaces, thereby providing a true surface contact to efficiently guide the roller. For practical manufacturing purposes these small spherical surfaces of the flanges may be formed conically of such shape that the elements of the cone are tangent to the spherical surfaces of the rollers. In this case the normal 99 to the tangent 101 at the midpoint of the inner course of rollers intersects the center line 103 of the assembly and determines radius 105, and radius 107 equal to radius 105 is struck from the normal 109 to tangent 111. Tangents 101 and 111 intersect in the center line 103 and determine the radius 113 forming the spherical ends of the rollers in the inner course. The outer course is similar.

In Figure 3 the cone 108 is provided with a spherical bearing surface 110 on which is mounted a plurality of courses of bearings 112 and 114, the roller bearing members 116 of each course being provided with bearing surfaces contacting the spherical surface 110 substantially throughout the length of the bearing surface of the rollers. The cup 118 is provided with spaced bearing surfaces 120 and 121 having cooperative relation with the bearing surfaces of the rollers substantially throughout the length thereof, and the cup is provided with thrust shoulders 122 and 124 cooperating with each course of bearings 112 and 114 respectively for guiding relation therewith. Each course of bearings is provided with a cage 126—128 having cooperative relation with the thrust shoulders of the cup for imparting rotary movement to the cage. The end surfaces 130 and 132 of the rollers are of spherical shape formed as in the case of the construction shown in Figures 1 and 2. The cooperating surfaces on the thrust shoulders are cooperating spherical surfaces, though they may be formed of conical shape, as in the case of Figures 1 and 2. It will be noticed that the radius 123 of the cone bearing surface is at the intersection of the bearing center line 125 and the normal 127 to the center point of the outer course of bearings, tangents 129 and 131 and center line 133 determining at their intersection with center line 125 the radius of the end bearing surfaces 130 (and 132 similarly). Radius 135 equal to radius 123 is in the normal 137 to tangent 131.

In Figure 4, the cup 134 is provided with a spherical bearing surface 136 having cooperative relation with the bearing surfaces of the barrel shaped anti-friction bearings 138, there being a slight lift at the ends thereof. The cone 140 is provided with a bearing surface 142 having cooperative relation with the rollers 138 substantially throughout their bearing length. The rollers are provided with a cage 144 having a portion cooperating with the cup whereby the cage is urged to rotate therewith. The cone is provided with a thrust shoulder 146 having a spherical bearing surface 148 cooperating with a corresponding spherical surface 150 provided on the large ends of the rollers, the spherical surface being generated in the same manner as has been described with respect to the other modifications, and the bearing surface of the thrust shoulder being susceptible of conical shape as has already been described. In this case the radius 141 is determined by the intersection of bearing center line 143 and the normal 145 to tangent 147. The radius of the surface 142 and of the elements of the rollers is less than radius 141, and is on normal 149 to tangent 151, normals 145 and 149 intersecting on the roller center line 153.

In the form of bearing illustrated in Figure 5 the rollers 152 are of frusto-conical shape cooperating with a bearing surface 154 of the cup 156, the bearing surface 154 being made up of straight line elements. The large ends of the rollers are provided with spherical surfaces 158 generated in the manner as has already been described and cooperating with the spherical or conical surface 160 provided on the shoulder 162 of the cup. The rollers are provided with the cage 164 urged to rotary movement by means of cooperation between the flange 166 and the shoulder 162. The bearing surface of the rollers 152 has cooperative relation with the bearing surface 168 of the outer section 170 of the two-part cone. The bearing surface 168 is formed of straight line elements. The inner surface 172 of the outer section 170 is of spherical shape, the radius 171 being struck from bearing center line 173, and has cooperative relation with a corresponding surface on the inner section 174 of the two-part cone, so that with this construction the roller bearings may oscillate with respect to the inner axle, and with respect to the inner section 174. Relative movement of rotation of the parts 170 and 174 is limited by providing one or more lugs, such as 174ª on part 174 which may interlock or engage with one or more lugs such as 170ª on part 170 of the inner racering. In order to prevent the two parts of the cone from wearing excessively, or from freezing, one of the parts, for example the inner portion 174, may be constructed of anti-friction metal such as brass, bronze, manganese bronze, or Monel metal. As an example of these metals the following is given:

Bronze

| | Percent |
|---|---|
| Alloy of copper | 88.5 |
| Tin | 11 |
| Impurities | .5 |
| | 100 |

Monel metal

| | Percent |
|---|---|
| Alloy of nickel | 67 |
| Copper | 28 |
| Various metal impurities | 5 |
| | 100 |

Manganese bronze

| | Percent |
|---|---|
| Alloy of copper | 68.5 |
| Aluminum | 4 |
| Tin | 22 |
| Iron | 2.5 |
| Manganese | 3 |
| | 100 |

As wear also occurs between the cages and the rollers, the cages in the construction illustrated in Figure 5, as well as in the other constructions, may also be formed of anti-friction metal.

The construction shown in Figure 6 is similar to that shown in Figure 4 in every particular except that the cage 176 is supportingly mounted on the cone, being provided with a flanged portion 178 disposed adjacent the bearing surface of the cone so that upon deflection of the inner axle the cage will move with the rollers.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a roller bearing assembly, the combination of an inner and outer racering, rollers disposed therebetween, the inner of said racerings comprising relatively movable members, the contact surfaces between said last-named members being spherical, the outer racering having a thrust shoulder thereon, said rollers having a spherical surface thereon cooperating with said thrust shoulder.

2. An anti-friction bearing comprising radially spaced race members, the outermost of said members having a thrust shoulder, a plurality of rollers between said members and cooperating with said thrust shoulder, the inner race member comprising relatively movable parts.

3. An anti-friction bearing comprising radially spaced race members, the outermost of said members having a thrust shoulder, a plurality of rollers between said members and cooperating with said thrust shoulder, the inner race member comprising relatively movable parts having spherical contact surfaces.

4. An anti-friction bearing comprising radially spaced race members, the outermost of said members having a thrust shoulder, a plurality of rollers between said members, said rollers and thrust shoulder having cooperative spherical surfaces, the inner race member comprising relatively movable parts.

5. An anti-friction bearing comprising radially spaced race members, the outermost of said members having a thrust shoulder, a plurality of rollers between said members, said rollers and thrust shoulder having cooperative spherical surfaces, the inner race member comprising relatively movable parts having spherical contact surfaces.

6. In a roller bearing assembly, the combination of an inner and outer racering, rollers disposed therebetween, the inner of said racerings comprising relatively movable members, the contact surfaces between said last-named members being spherical, the outer racering having a thrust shoulder thereon, said rollers having a spherical surface thereon cooperating with said thrust shoulder, said movable members having means limiting the relative movement of rotation therebetween.

7. An anti-friction bearing comprising radially spaced race members, the outermost of said members having a thrust shoulder, a plurality of rollers between said members and cooperating with said thrust shoulder, the inner race member comprising relatively movable parts, said movable parts having means limiting the relative movement of rotation therebetween.

8. An anti-friction bearing comprising radially spaced race members, the outermost of said members having a thrust shoulder, a plurality of rollers between said members and cooperating with said thrust shoulder, the inner race member comprising relatively movable parts having spherical contact surfaces, said movable parts having means limiting the relative movement of rotation therebetween.

9. An anti-friction bearing comprising radially spaced race members, the outermost of said members having a thrust shoulder, a plurality of rollers between said members, said rollers and thrust shoulder having cooperative spherical surfaces, the inner race member comprising relatively movable parts, said movable parts having means limiting the relative movement of rotation therebetween.

10. An anti-friction bearing comprising radially spaced race members, the outermost of said members having a thrust shoulder, a plurality of rollers between said members, said rollers and thrust shoulder having cooperative spherical surfaces, the inner race member comprising relatively movable parts having spherical contact surfaces, said movable parts having means limiting the relative movement of rotation therebetween.

ALFRED H. OELKERS.
FRED E. BACHMAN.